April 25, 1967     P. BRACHT     3,315,576
METHOD OF MAKING A SIDEWALL FOR A SHIPPING CONTAINER
Filed Jan. 4, 1965     2 Sheets-Sheet 1
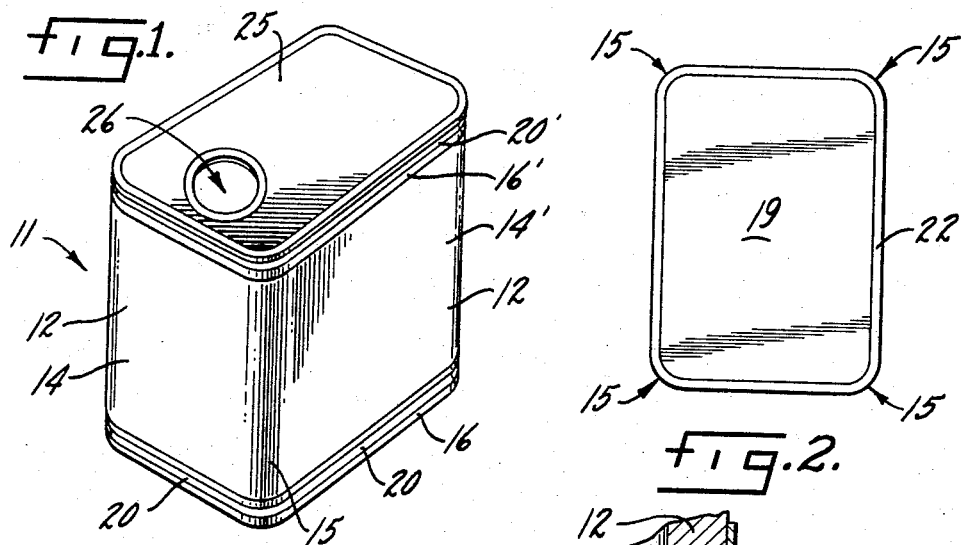
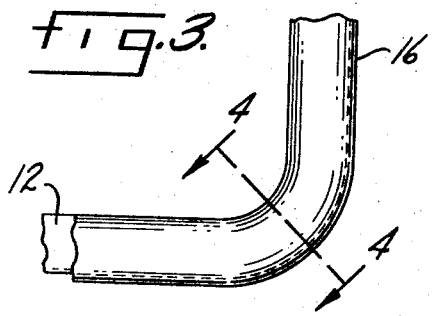
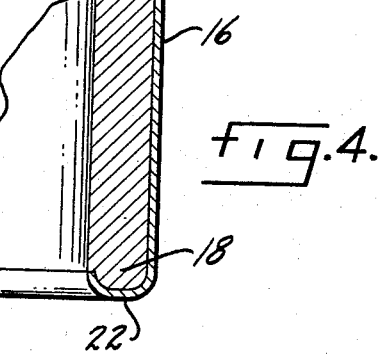
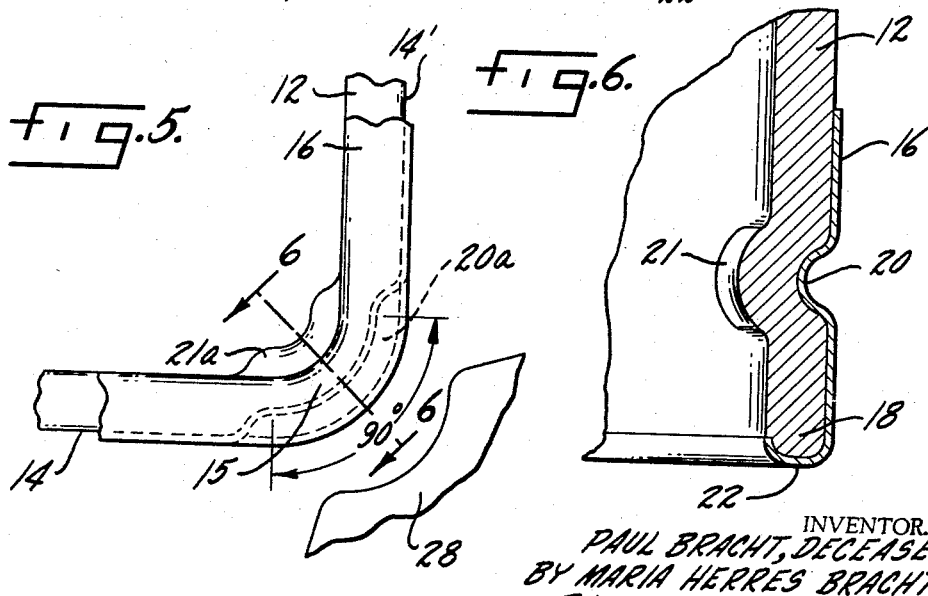
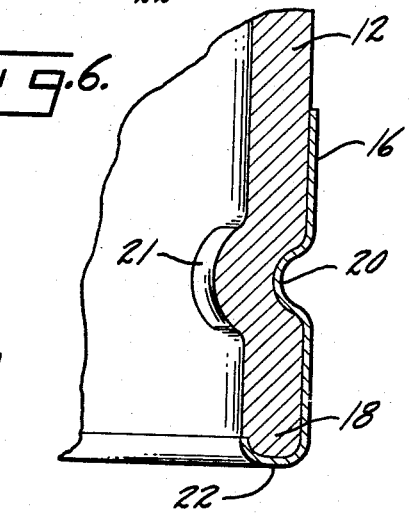
INVENTOR.
PAUL BRACHT, DECEASED
BY MARIA HERRES BRACHT
BY Wolfe, Hubbard, Voit & Osann
ATTORNEYS.

April 25, 1967    P. BRACHT    3,315,576
METHOD OF MAKING A SIDEWALL FOR A SHIPPING CONTAINER
Filed Jan. 4, 1965    2 Sheets-Sheet 2
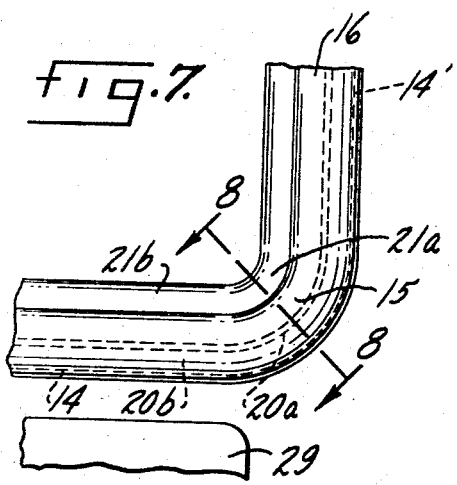
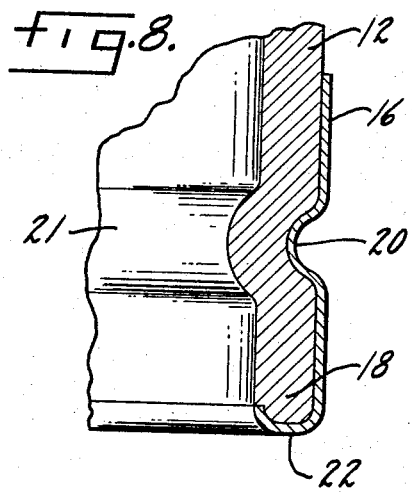
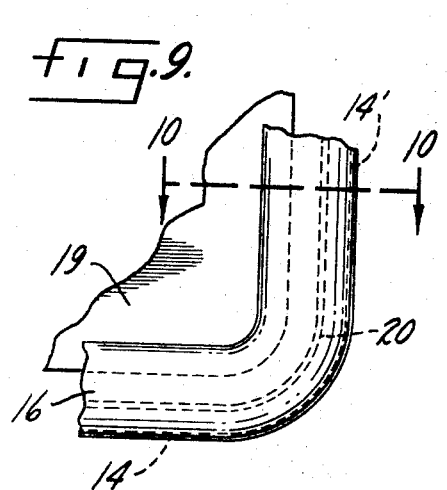
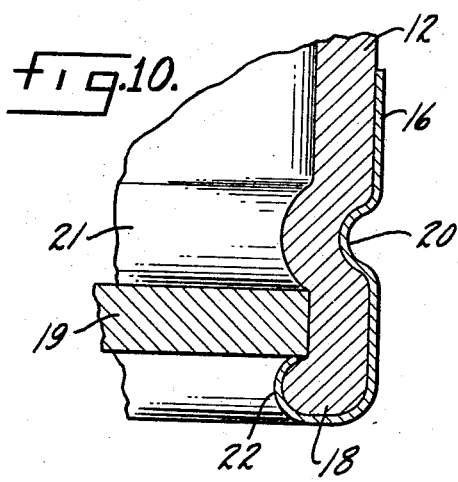
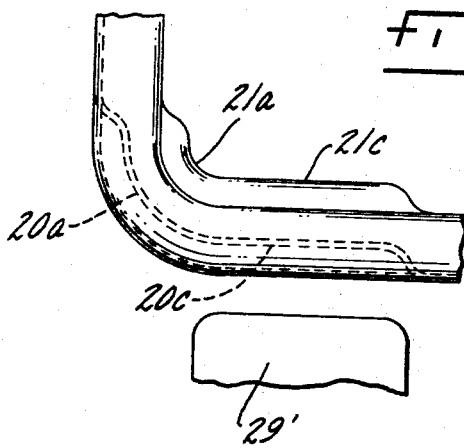
INVENTOR.
PAUL BRACHT, DECEASED
BY MARIA HERRES BRACHT
BY
Wolfe, Hubbard, Voit & Osann
ATTORNEYS.

United States Patent Office 3,315,576
Patented Apr. 25, 1967

3,315,576
METHOD OF MAKING A SIDEWALL FOR A SHIPPING CONTAINER
Paul Bracht, deceased, late of Porz-Westhoven, near Cologne, Germany, by Maria Herres Bracht, sole heir, Porz-Westhoven, near Cologne, Germany, assignor to Inland Steel Company, Chicago, Ill., a corporation of Delaware
Filed Jan. 4, 1965, Ser. No. 423,398
14 Claims. (Cl. 93—55.1)

The present invention relates to shipping containers and, more particularly, to improved methods for manufacturing such containers. In its principal aspect, the invention is concerned with improved methods for shaping at least one extremity of the sidewalls of polygonal shipping containers made from deformable material such, for example, as paperboard, fiberboard, kraft-liner board, thermoplastic materials, or similar natural or synthetic materials, and for simultaneously shaping any metallic reinforcing band surrounding such extremity, thereby forming a peripherally continuous internal rib or seat adjacent the extremity of the sidewall and permitting connection of one or more closure members to such shaped polygonal sidewall to form a complete container.

During recent years, there has been an increasing demand for an economical and reliable polygonal shipping container which, because of its polygonal configuration, can be stored or stacked in the storage space of a truck, ship, or similar transportation media, so as to completely, or at least almost completely, fill the available storage space. Such containers have, heretofore, generally been provided with triangular, rectangular, or hexagonal horizontal cross sections. However, the manufacture of such containers, and consequently the use thereof, has, until the advent of the present invention, been very limited. This has been due, in part, to the cost of the forming equipment required to form peripherally continuous internal ribs or seats in the polygonal sidewalls adjacent at least one extremity thereof; and, in part, to difficulties encountered during the forming operation in preventing warping of the sidewall and slanting of the formed ribs after the forming equipment is removed. Moreover, when there is a demand for such containers in more than one size (i.e., containers having different cross sectional dimensions), it is generally necessary that the die elements used for forming the sidewalls be stocked in various sizes commensurate with the size of the particular containers to be formed, thus placing an undue burden on the manufacturer in terms of initial capital expenditures, storage facilities required for such equipment, and maintenance of such forming equipment.

Because of the foregoing, and despite recognition of the advantages attendant the use of polygonal containers which can be stacked side-to-side and end-to-end so as to make substantially complete use of available storage space, manufacturers and users of shipping containers have, nevertheless, been forced to resort to the use of cylindrical containers which permit only partial employment of available storage space. Such cylindrical containers can be readily formed with internal ribs or seats adjacent one or both extremities for the purpose of seating closure members, and they can be easily and economically formed with very simple tools in virtually any desired size. For example, internal peripherally continuous ribs can be formed in a cylindrical sidewall by the simple expedient of pressing one or more rollers into the sidewall and then rotating either the rollers or the sidewall about the vertical axis of the latter. This procedure, however, while practical with cylindrical sidewalls, is not practical when dealing with polygonal containers.

It is a general aim of the present invention to provide improved methods for forming one or more continuous peripheral internal ribs adjacent one or both extremities of a polygonal container sidewall, such rib or ribs defining a seat or seats for conventional container closure members, which improved methods are characterizsed by their simplicity and adaptability in forming ribs in virtually any sized container sidewall. While not so limited in its application, the invention will find especially advantageous use in the simultaneous formation of a peripherally continuous rib in a polygonal sidewall and a peripherally continuous external groove in any metallic reinforcing band encompassing the marginal sidewall extremity, the rib and groove thus formed being complementary.

Another object of the invention is the provision of improved methods for forming ribs in polygonal sidewalls which can be carried out with simple and inexpensive tooling suitable for use in making sidewalls having cross sectional dimensions which may vary from container to container over relatively wide ranges.

In another of its important aspects, it is an object of the invention to provide improved methods for making ribbed sidewalls which preclude warping of the flat side surfaces of the sidewalls and consequent slanting of the internal rib as an incident to formation of the latter.

Other objects and advantages of the invention will become apparent as the following description proceeds, taken in conjunction with the accompanying drawing, in which:

FIG. 1 is a perspective view of a completed shipping container having ribs formed therein in accordance with the methods of the present invention;

FIG. 2 is a bottom plan view of the container shown in FIG. 1;

FIG. 3 is a fragmentary bottom view, on an enlarged scale, of a container sidewall and reinforcing band, here shown prior to formation of a rib in the sidewall and a complementary groove in the band by methods embodying the invention;

FIG. 4 is a fragmentary vertical cross-sectional view of the sidewall and reinforcing band taken substantially along the line 4—4 in FIG. 3;

FIG. 5 is a fragmentary bottom view similar to FIG. 3, here depicting the container shown in FIG. 1 during its manufacture and following completion of one step in the manufacturing procedure of the present invention;

FIG. 6 is a fragmentary cross-sectional view similar to FIG. 4, here taken substantially along the line 6—6 of FIG. 5;

FIG. 7 is a view similar to FIGS. 3 and 5, here illustrating the container sidewalls following completion of a later step in the manufacturing procedure of the present invention;

FIG. 8 is a view similar to FIGS. 4 and 6, here taken substantially along the line 8—8 of FIG. 7;

FIG. 9 is a fragmentary bottom view, on an enlarged scale, of the container shown in FIG. 1 after completion of its manufacture;

FIG. 10 is a fragmentary cross-sectional view taken substantially along the line 10—10 of FIG. 9; and, FIG. 11 is a fragmentary bottom view, on an enlarged scale, of a container sidewall here being made in accordance with the invention but by a slightly modified manufacturing procedure.

While the invention is susceptible of various modifications and alternative forms, specific embodiments thereof have been shown by way of example in the drawings and will herein be described in detail. It will be understood, however, that it is not intended to limit the invention to the particular form disclosed, but, on the contrary, the intention is to cover all modifications, equivalents and alternatives falling within the spirit and scope of the invention as expressed in the appended claims.

Referring more particularly to the drawings, there is illustrated in FIG. 1 an exemplary shipping container, generally indicated at 11, such container here shown as having a substantially rectangular cross-section. In the illustrative construction, the container 11 is shown as including a peripherally continuous sidewall 12 having substantially flat sides 14, 14′ and rounded corners 15. As the ensuing description proceeds, it will become apparent that the container sidewall can be made of a wide range of deformable materials such, merely by way of example, as fiberboard, paperboard, kraft-liner board, thermoplastic materials, or other natural or synthetic deformable materials.

For the purpose of strengthening the sidewall 12 and increasing the resistance thereof to destructive deformation forces, a reinforcing metallic band 16 is positioned in surrounding relation to the lower extremity 18 (FIG. 4) of the sidewall. In order to provide a seat for accurately positioning a closure member or bottom wall 19 (FIG. 2), the band 16 is externally grooved as shown at 20 (FIGS. 1, 6, 8 and 10), thus deforming the adjacent sidewall 12 inwardly to form a peripherally continuous rib 21 defining a seat. Preferably, the band 16 is formed with a flange 22 (FIGS. 2 and 4) which is curved or bent beneath the free peripheral edge of the lower extremity 18 of the container sidewall 12.

In the construction of the exemplary container 11, the lower end of the sidewall 12 is closed by means of the bottom wall 19 which is dimensioned to fit within and conform to the internal configuration of the sidewall 12, the bottom wall 19 here fitting snugly against the seat or rib 21 as best shown in FIG. 10. The bottom wall 19, which may, for example, be formed of plywood or the like, is held in fixed position by folding or curling the lower extremity 18 of the sidewall 12 and the band 16 over into engagement with the peripheral edge 24 of the bottom wall.

In order to close the upper end of the exemplary container 11 shown in FIG. 1, a cover or lid 25 is secured within the upper contour of the sidewall 12 in a manner similar to that employed for the bottom wall 19. In this instance, an annular metallic band 16′ having a groove 20′ formed therein, is positioned in surrounding relation to the upper extremity of the sidewall 12. The cover or lid 25 is secured against an upper internal rib (not shown in the drawings but preferably identical to the lower rib 21 and complementary to and adjacent the groove 20′) by the simple expedient of folding over or curling the upper extremity of the sidewall 12 together with the metal band 16′ so as to clamp the peripheral edge of the lid 25 against the upper internal rib or seat. The lid 25 is preferably provided with a sealing and pouring orifice closed by any suitable closure means generally indicated at 26 (FIG. 1). Alternatively, the cover or lid 25 may be removable from the container 11. In such an alternative construction, the lid 25 would preferably be seated on the upper internal rib by means of a conventional expansible and contractible ring (not shown).

The present invention is concerned with new and improved methods for forming a sidewall for a container and, more specifically, for forming the peripherally continuous groove 20 in the reinforcing band 16 and the complementary internal rib 21 in the sidewall 12. However, prior to the formation of such a groove and rib, the sidewall 12 is made in accordance with any one of the conventional methods known to those skilled in the art for forming the same such, for example, by forming a hollow sheath or shell of a selected deformable material and shaping the shell so as to confer to it a cross-sectional form having substantially flat sides 14, 14′ interconnected by the rounded corners 15. Subsequently, the formed sidewall 12 is provided with an annular reinforcing metallic band 16 adjacent at least one of its extremities, e.g., the lower extremity 18, such band preferably being provided with the flange 22 which is curled about the lower edge of the lower sidewall extremity 18 in any suitable and known manner (FIGS. 3 and 4).

In accordance with one of the important aspects of the present invention, provision is made for forming the internal rib 21 or seat in a polygonal container sidewall 12 in successive discrete stages, as contrasted with the single stage forming operation heretofore commonly employed with, for example, cylindrical containers, thereby permitting formation of such a rib with simple, inexpensive, and versatile forming equipment, while at the same time substantially eliminating sidewall warpage and slanting of the formed ribs. To accomplish this, and with particular reference to FIGS. 5 and 6, the initial rib forming stage (as performed pursuant to one form of the invention) comprises the formation of an arcuate first portion 20a of the groove 20 in the rounded corners of the band 16, the arcuate first portion here conforming to the contour of the band adjacent the extremity 18 of the sidewall 12. Preferably, each of the curved grooves 20a (i.e, the grooves in each corner of the polygonal sidewall) extends from one end of the associated rounded corner 15 adjacent one of the substantially flat sides (e.g., side 14 in FIG. 5) to the other end of the rounded corner adjacent the other substantially flat side (here the side designated by the reference numeral 14′). As shown in FIGS. 5 and 6, inward deformation of the band 16 to form the external curved grooves 20a simultaneously causes deformation of the lower extremity 18 of the adjacent sidewalls 14, 14′, thus forming a complementary internal curved first portion 21a of the rib 21 on the inner side of each rounded corner 15.

Such curved grooves 20a can be readily pressed into the corners of the band 16 and sidewall 12 with relatively simple apparatus or tools. For example, simple press or die elements having substantially the same curvature as the outer surface of the rounded corners 15 may be used, such an element being diagrammatically represented at 28 in FIG. 5. In this instance, the element 28 is preferably dimensioned so as to embrace the full curvature of the rounded corner 15. For example, in the exemplary rectangular or guadrangular container illustrated in the drawings, the forming element 28 is formed with a curved working face comprising a 90° segment of a circular arc. Thus, the same curved press element 28 may be used to successively form the curved grooves 20a in all of the other rounded corners 15 one after another, provided that they all have substantially the same curvature, a condition which is usually present in conventional containers having regular geometrical shapes. Of coure, if desired, all of the curved grooves 20a may be pressed simultaneously in all of the rounded corners without departing from the scope of the invention. In such a case, for example, in connection with the illustrative rectangular container 11 (FIG. 1), the forming apparatus would include four substantially identical press elements 28 which are simultaneously collapsed inwardly relative to the band 16 so as to form the four curved grooves 20a.

The curved grooves 20a thus formed constitute steady marks or guides which serve to facilitate accurate relative orientation of the sidewall 12 and the apparatus or tools used for forming straight second portions 20b (FIG. 7) of the groove 20 and the complementary straight second portions 21b of the rib 21. Such straight portions 20b, 21b are formed in the flat side of the band 16 and the sidewall 12 respectively adjacent their extremities (FIGS. 7, 8 and 11) and in line with the previously formed curved portions 20a, 21a, the straight portions 20b, 21b thus serving to respectively interconnect adjacent curved portions formed in two adjacent rounded corners of the container 11. The straight grooves 20b and complementary straight ribs 21b may be formed with the aid of one or more rollers (not shown), a technique well known to those skilled in the art and commonly employed for forming grooves and complementary ribs in reinforced cylindrical sidewalls. However, when dealing with polygonal containers of the type shown by way of example in FIG. 1, the rollers are positioned against and pressed into the substantially flat sides 14, 14' of the sidewall 12 and moved relative thereto along a line interconnecting a pair of the previously formed curved grooves 20a, thus forming a straight groove 20b connecting such adjacent curved grooves 20a.

In the illustrative form of the invention, however, the straight grooves 20b are formed in the flat sides 14, 14' by means of a straight press element such as that diagrammatically represented at 29 in FIG. 7, which element may extend along the entire length of the particular flat side being formed (here the side 14). However, in carrying out the container forming procedure of the present invention in accordance with a slightly modified shaping operation, the straight grooves 20b and straight ribs 21b are formed with a press element dimensioned to extend over only a part of the length of the particular flat side being formed, thus simplifying the construction of the forming equipment and reducing initial, operating, and maintenance costs thereof. To this end, a press element 29' (FIG. 11), dimensioned to extend along only a portion of the particular flat side (side 14' as shown in FIG. 11) being formed, is positioned against and pressed into the container so as to form a first portion 20c of the straight groove 20b and a first portion 21c of the straight rib 21b. The press element 29' is then moved relative to the container 11 and again pressed into the container adjacent the portions 20c, 21c, thus forming a continuation of the straight groove and rib. This operation is continued with the press element 29' being displaced laterally relative to the container so as to form the groove 20b and rib 21b in a series of sequential pressing operations, upon completion of which the straight groove 20b and rib 21b thus formed interconnect a pair of curved grooves 20a and ribs 21a previously formed in the corners adjacent the flat side 14.

Those skilled in the art will appreciate that the foregoing operation could, if desired, also be carried out simultaneously on all of the substantially flat sides of the sidewall 12 by simply utilizing forming apparatus provided with as many press elements 29 as there are faces in the sidewall.

Thus, when the two rib forming stages of the method according to the present invention have been accomplished, a peripherally continuous internal rib 21 is obtained on the internal side of the sidewall 12, thereby permitting the bottom wall 19 of the container 11 to be positioned against such rib or seat and secured thereto in any suitable manner such, for example, as by folding the extremity 18 of the sidewall 12 together with the annular reinforcement band 16 over into engagement with the peripheral edge 24 of the bottom wall 19. Of course, it will be understood that the foregoing operations can also be conducted in a similar manner for forming the internal rib in the upper part of the container when such an upper rib is desired.

It will be appreciated that there has hereinabove been disclosed new and improved methods for forming a peripherally continuous rib in the sidewall of a polygonal container, which methods can be carried out with very simple and inexpensive apparatus and tools. Of course, while the method has been described in connection with the formation of a rib in a substantially rectangular container, it will be understood that it is equally applicable when making triangular or hexagonal containers and, as a general rule, any other types of polygonal containers.

Moreover, it will be understood that the same tools may be used when forming virtually any size container in accordance with the invention, provided, of course, that the rounded corners have a substantially constant curvature.

Yet another advantageous feature of the present invention resides in the fact that since the internal ribs are formed in successive stages—viz., the curved rib portions 21a and straight rib portions 21b are not formed simultaneously, but rather successively—the first portions formed (whether the curved portions 21a as described or the straight portions 21b) act not only as guides, but also as points of support for the second portions thus formed, thereby precluding warping of the flat sides and slanting of the internal rib.

I claim as my invention:

1. The method of forming an internal continuous peripheral rib in the sidewall of a polygonal container made of deformable material and having a plurality of substantially flat sides interconnected by rounded corners comprising the steps of deforming the rounded corners of the sidewall material at a given distance from one extremity of the sidewall during one forming stage by forming externally disposed curved grooves therein with such curved grooves defining the curved portions of the internal rib, and deforming the flat sides of the sidewall material at said given distance from said one extremity of the sidewall during another forming stage by forming externally disposed straight grooves therein with such straight grooves defining the straight portions of the internal rib.

2. The method of forming an internal continuous peripheral rib in the sidewall of a polygonal container as set forth in claim 1 wherein all of the curved grooves are formed during a first forming stage and all of the straight grooves are subsequently formed during a second forming stage.

3. The method of forming an internal continuous peripheral rib in the sidewall of a polygonal container as set forth in claim 1 wherein each of the curved grooves is pressed in a single step operation into each of the rounded corners so as to extend substantially from one flat side adjacent that rounded corner to the other flat side adjacent that rounded corner.

4. The method of forming an internal continuous peripheral rib in the sidewall of a polygonal container as set forth in claim 1 further characterized in that the curved grooves are pressed simultaneously into all of the rounded corners.

5. The method of forming an internal continuous peripheral rib in the sidewall of a polygonal container as set forth in claim 1 further characterized in that each of the straight grooves is pressed in a single step operation into each of the substantially flat sides so as to extend from one rounded corner to an adjacent rounded corner.

6. The method of forming an internal continuous peripheral rib in the sidewall of a polygonal container as set forth in claim 1 further characterized in that each of the straight grooves in the flat sides are formed by successively pressing into the sidewall material in sequential order a series of relatively short straight grooves with all of the relatively short straight grooves forming a single straight groove extending from one rounded corner of the container to an adjacent rounded corner of a container.

7. The method of forming an internal continuous peripheral rib in the sidewall of a polygonal container as set forth in claim 1 further characterized in that all of the straight grooves are pressed simultaneously into all of the flat sides of the container sidewall.

8. The method of forming an internal continuous peripheral rib in the sidewall of a polygonal container of the type having a plurality of substantially flat sides interconnected by rounded corners comprising the steps of applying a peripherally continuous metallic band to the container sidewall in snug surrounding relation to at least one extremity thereof, simultaneously deforming the rounded corners of the band and the adjacent rounded corners of the sidewall material at a given distance from said one container extremity during one forming stage by pressing externally disposed curved grooves into the rounded corners of the band so as to displace the sidewall material adjacent thereto inwardly and thereby forming the curved portions of the internally disposed rib, and simultaneously deforming the flat sides of the band and the adjacent sidewall material at said given distance from said one extremity of the sidewall during another forming stage by pressing straight grooves into the outer surface of the flat sides of the band so as to displace the sidewall material adjacent thereto inwardly and thereby forming the straight portions of the internally disposed rib.

9. The method of forming an internal continuous peripheral rib in the sidewall of a polygonal container as set forth in claim 8 wherein all of the curved grooves and curved portions of the internally disposed rib are formed during a first forming stage and all of the straight grooves and straight portions of the internally disposed rib are subsequently formed during a second forming stage.

10. The method of forming an internal continuous peripheral rib in the sidewall of a polygonal container as set forth in claim 8 wherein each of the curved grooves and the adjacent curved portions of the internally disposed rib are simultaneously pressed in a single step operation into each of the rounded corners so as to extend substantially from one flat side adjacent that rounded corner to the other flat side adjacent that rounded corner.

11. The method of forming an internal continuous peripheral rib in the sidewall of a polygonal container as set forth in claim 8 further characterized in that the curved grooves and curved rib portions are pressed simultaneously into all of the rounded corners.

12. The method of forming an internal continuous peripheral rib in the sidewall of a polygonal container as set forth in claim 8 further characterized in that each of the straight grooves and the adjacent straight portions of the internally disposed rib are simultaneously pressed in a single step operation into each of the substantially flat sides so as to extend from one rounded corner to an adjacent rounded corner.

13. The method of forming an internal continuous peripheral rib in the sidewall of a polygonal container as set forth in claim 8 further characterized in that each of the straight grooves and the adjacent straight portions of the internally disposed rib are simultaneously formed in their associated flat side of the container by successively pressing into the metallic band in sequential order a series of relatively short straight grooves so as to displace the sidewall material and successively form a series relatively short straight rib portions on the internal surface of the sidewall with all of the relatively short straight grooves and straight rib portions forming a single straight groove and a single straight rib respectively extending from one rounded corner of the container to an adjacent rounded corner of a container.

14. The method of forming an internal continuous peripheral rib in the sidewall of a polygonal container as set forth in claim 8 further characterized in that all of the straight gooves and straight ribs are pressed simultaneously into all of the flat sides of the container sidewall.

No references cited.

WILLIAM W. DYER, Jr., *Primary Examiner.*

JAMES M. MEISTER, *Examiner.*